US006408326B1

(12) United States Patent
Larsson et al.

(10) Patent No.: US 6,408,326 B1
(45) Date of Patent: Jun. 18, 2002

(54) METHOD AND SYSTEM FOR APPLYING A POLICY TO BINARY DATA

(75) Inventors: Jeffrey E. Larsson, Seattle; Kirk A. Glerum; Joel W. Downer, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/295,050

(22) Filed: Apr. 20, 1999

(51) Int. Cl.$^7$ .............................................. G06F 13/00
(52) U.S. Cl. ...................................................... 709/201
(58) Field of Search ................................ 709/200, 201, 709/202, 203, 217, 218, 219

(56) References Cited

U.S. PATENT DOCUMENTS

| 5,991,877 A | * | 11/1999 | Luckenbaugh | 713/200 |
| 6,029,246 A | * | 2/2000 | Bahr | 709/202 |
| 6,158,010 A | * | 12/2000 | Moriconi et al. | 709/201 |
| 6,189,100 B1 | * | 2/2001 | Barr et al. | 713/182 |

* cited by examiner

Primary Examiner—Moustafa M. Meky
(74) Attorney, Agent, or Firm—Merchant & Gould

(57) ABSTRACT

Applying a system policy for a program module to binary-formatted data within registry of a computer system operating within an administered computer network environment. At program launch, a program can search a particular location in registry to locate certain registry values maintained at that registry location. The program enumerates the name/value pairs maintained at that registry location. These registry values typically have a format that describes an offset defining a location within a global data structure and the number of binary bits that can be processed at that data structure location. In this manner, registry data values maintained within a predetermined location of the registry can be encoded to include content that supports the application of a system policy to the binary values maintained in the global data structure. Although the application of system policy will change the original value stored at the specified location within the global data structure, this original value can be recorded prior to translating the policy value into a bit mask that can be applied to the data structure. At the conclusion of the program session, any changes applied to the global data structure can be rolled back to the original values to enable these original values to persist for subsequent use during another program session.

16 Claims, 4 Drawing Sheets

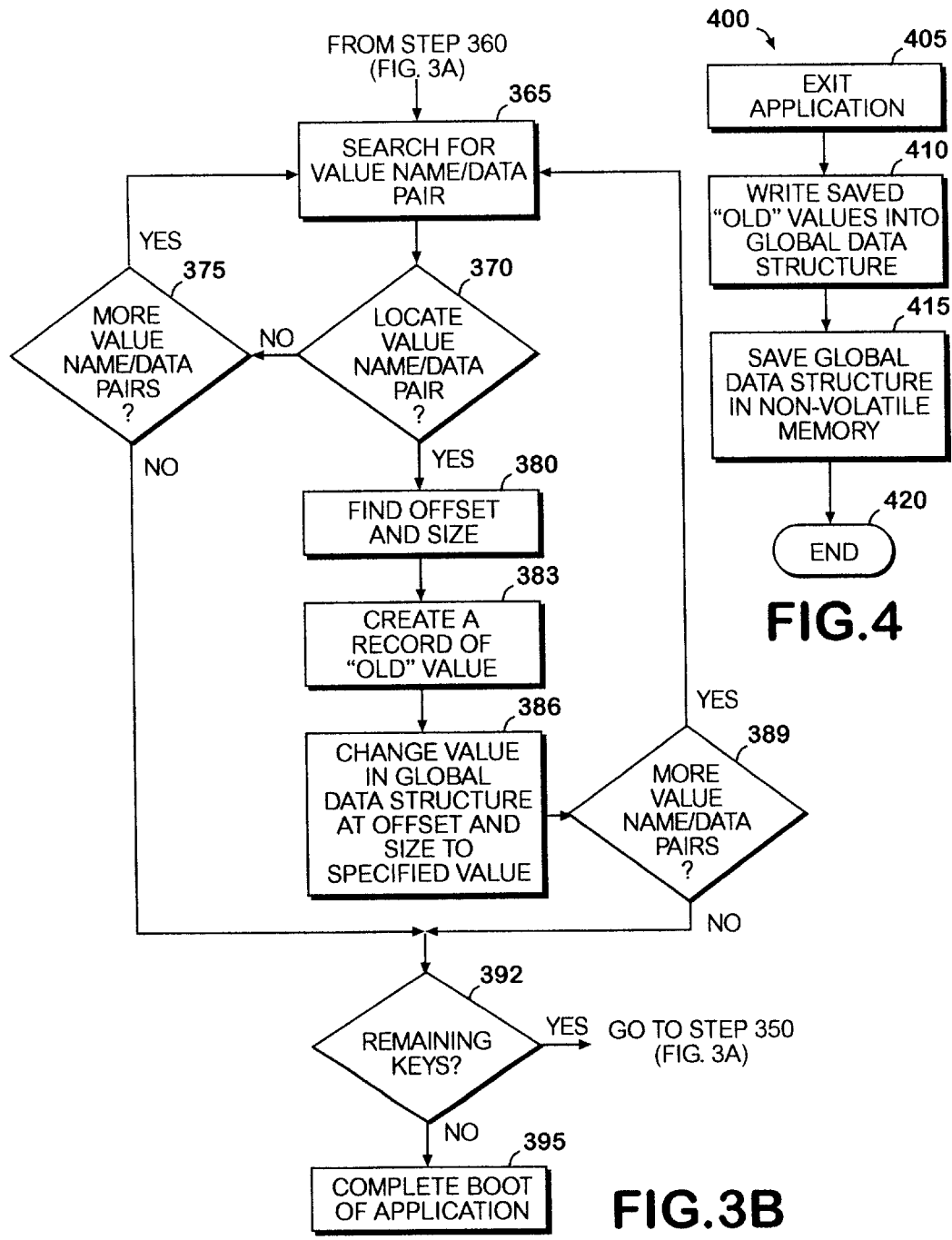

METHOD AND SYSTEM FOR APPLYING A POLICY TO BINARY DATA

TECHNICAL FIELD

This invention relates to the application of a system policy for program modules, such as application programs, for storing user preferences and other data in binary format within the registry of an operating system for a computer system. More particularly, this invention relates to applying one or more system policies to end user's machines within an administered network environment for application programs that can write registry parameters in a binary format.

BACKGROUND OF THE INVENTION

A system policy is a method of remotely controlling end users' desktops in an administered network environment. It allows network administrators to control registry parameters such as user preferences or restrictions. A representative tool for defining a system policy is the System Policy Editor, which consists of a single executable (poledit.exe) that runs on "WINDOWS 95," "WINDOWS 98" and "WINDOWS NT 4.0" operating systems developed and marketed by Microsoft Corporation of Redmond, Wash.

The System Policy Editor works in conjunction with templates, which are text files typically having a certain format and the extension ADM. The policy template is written by the application vendor to expose registry settings of interest to the administrator. The administrator runs the policy editor, opens a policy template, selects a setting, and chooses a value to enforce. The results are stored in a policy (POL) file, which is typically stored on the network logon server or another specified location. When a client computer logs on to the server network, the operating system running on the client computer locates the POL file and applies the policies to the end user's machine.

Prior system policy editors have supported data of types string (REG_SZ), expandable string (REG_EXPAND_SZ), or double-byte numeric (REG_DWORD), but have not supported binary data (REG_BINARY). For programs that store user preferences and other data in binary format, a system administrator has been unable to use an available system policy tool to implement a policy affecting those binary settings. System administrators have been frustrated that registry settings of interest for a policy could not be enforced for programs that store user preferences and other data in binary format within the registry. In view of the foregoing, there is a need in the art for a mechanism that enables a system administrator to enforce a system policy within an administered network environment for programs that store binary-formatted data within the registry of a computer system.

One prior technique for addressing the enforcement of a system policy for registry data maintained in a binary format is the creation of registry "override" data for a selected set of registry values. Registry override data comprises discrete value name/data pairs that correspond to specific bits for registry data maintained in a binary format. Because the registry override data is maintained in string or numeric data format, a system administrator can implement a system policy that affects the registry override settings. During application launch, the application can determine whether a policy file has applied system policy to a registry override value and, if so, the application can change the value for the corresponding bit in the binary formatted data of the registry.

Although the registry override solution allows a system administrator to apply system policy to selected set of binary formatted registry values, this solution is available only for a minimum number of registry values because each registry override affects the launch time of the application. In addition, the registry override solution is not extensible when new registry settings are added to another release of the application. Because the registry override values affected by system policy are written to disk in response to exiting the application, the prior registry values set by the user are "infected" by the system policy values. In other words, the user's preferred assignment of registry values corresponding to the registry override values are effectively overwritten by the application of system policy and are no long available for future application sessions, including those sessions conducted away from the administered computer network. Consequently, there is a need for an extensible mechanism for efficiently applying a system policy to registry data having a binary format. There exists a further need for a mechanism that can apply a system policy binary-formatted registry values without "infecting" user preferences in the registry.

In summary, the prior art has failed to provide an extensible and efficient mechanism for applying a system policy to registry data having a binary format. System administrators have been frustrated by the lack of a commonly available tool for applying a system policy affecting numerous binary registry data values. Likewise, users of machines in an administered computer network do not desire the permanent replacement of user registry values by registry override values that infect the preferred user settings in the registry. The present invention addresses these and other problems in the prior art by using registry data having a predetermined format to alter data maintained in a binary data structure to enforce a particular policy value for each application session.

SUMMARY OF THE INVENTION

The present invention can read alphanumeric data of a registry of a computer system and interpret this data as values of one or more binary bits stored in a global data structure. These values of specific bits for the global data structure can be changed during the run-time of a program module, such as an application, without affecting the other values in the data structure. In this manner, the invention allows system policies, which are normally limited to string or numeric data types, to include data that an application stores in binary format.

The invention also can prevent the writing of temporarily altered bit values to permanent storage when the data structure is saved during normal program module execution or shut-down sequences. The invention can avoid permanently writing policy data to a storage mechanism, such as the hard disk of the user's machine, because the existing values of bits set by a policy are stored in a temporary data structure while the application is running. When the user exits the application, the temporarily stored values are written back into the data structure before it is saved to the hard disk of the user's machine. In this manner, system policies desired by a system administrator may be implemented on a user's machine without permanently altering the setup of a user's machine.

Registry data is typically read by an application when the application is booted. For each global data structure, the application searches a particular location in the registry and enumerates named values. Named values preferably have a format that describes an offset defining a start position in the data structure and the number of affected bits. The value data defines the values applied to the affected bits. The value name is formatted with the information needed to correctly apply the policy.

For one aspect of the present invention, the syntax for value names is <comment>_<offset>_<number of bits>. The <comment> is optional and used primarily for documentation purposes. The <offset> describes the start location in the global data structure for which the policy is intended to control. More precisely, the <offset> describes the number of bits from the beginning of the data structure to the beginning of the region that this policy controls. The <number of bits> describes the size of this particular setting in bits.

Although a policy value can be written to the user's registry when the user logs onto the network, the value has no effect until the user boots the application. During application boot or launch, the application attempts to load policy settings for its binary setting objects by opening and enumerating the contents of the appropriate keys in the registry. When a registry key corresponding to a data structure does not exist or is empty, the application will assume that no policies are set for that structure and move on. The invention can use a key path, which is a location in the registry where a value is written, to distinguish between policies intended for different applications. A key path also can be used to distinguish between policies intended for different data structures within the same application.

When the application finds values under one of the special policy keys, the value name is parsed to search for the underscore separator to determine the offset and size of the bit field the policy is intended to control. If the offset and size are valid, a record of the original value of the data structure field is created and that record is added to a list of all policy changes applied to this data structure. The application can then translate the value associated with the policy into a bit mask applied to the data structure.

When the user exits the application, the application will save changes made to its settings. Before these settings are saved to the hard disk of the user's machine, the application checks the list of policy changes for each of the data structures affected by a policy. If the application has added any records to this list during start-up, those changes are now "rolled back" to erase any changes made to the fields affected by policy. This also can overwrite any user changes to the affected fields. In other words, the fields are effectively locked so long as policy is present.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIGS. 3A and 3B are logical flowchart diagrams illustrating the steps of a method for applying a system policy within an administered computer environment for applications that store registry data within a binary format in accordance with an embodiment of the present invention.

FIG. 4 is a logical flowchart diagram illustrating the steps of a method for replacing temporary registry values with archival registry values in accordance with an exemplary embodiment of the present invention.

DETAILED DESCRIPTION OF THE EXEMPLARY EMBODIMENTS

Figure 1:
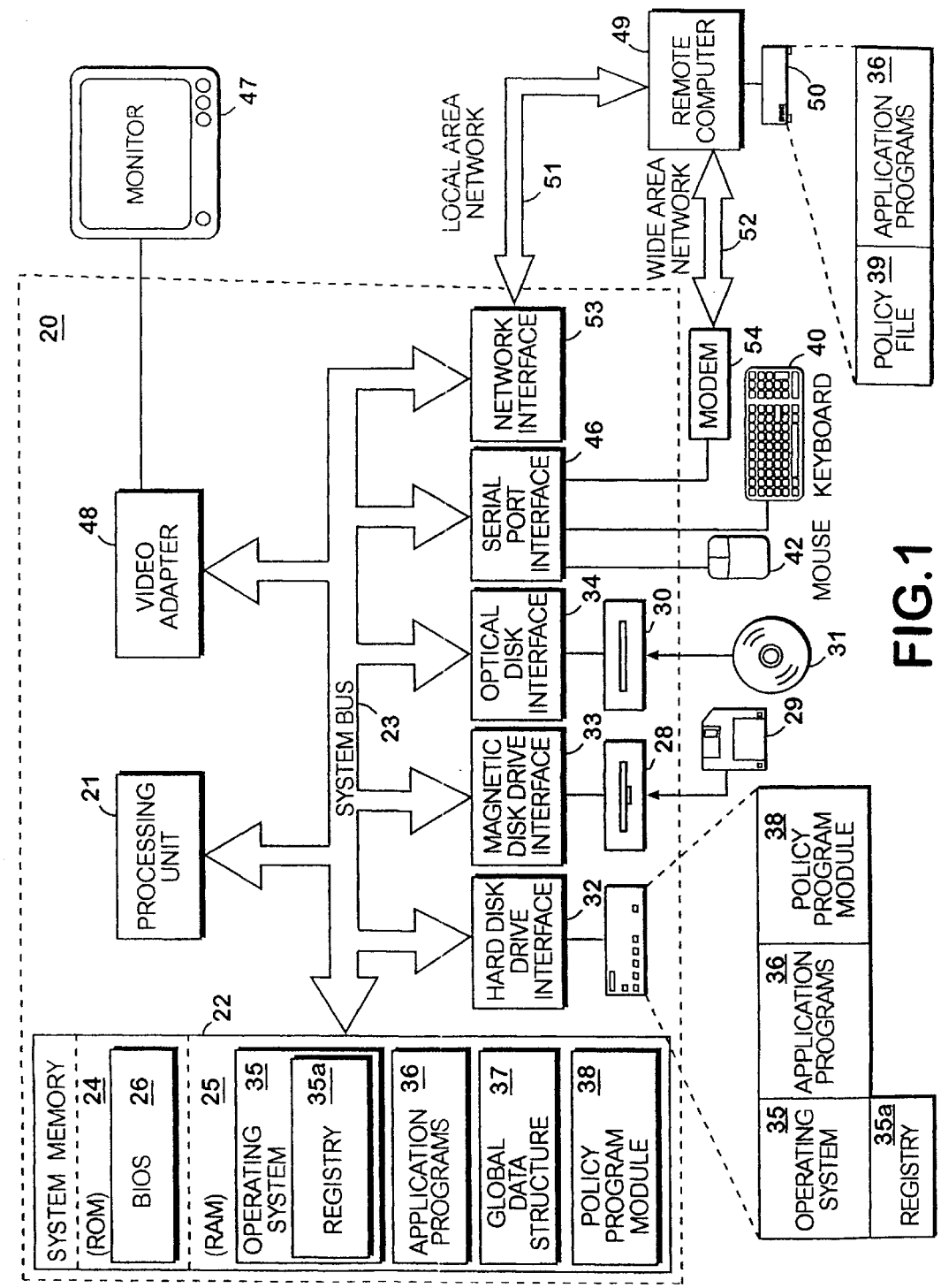
FIG. 1 is a block diagram of a computer that provides the exemplary operating environment for the present invention.

The present invention is directed to the application of a system policy for computers operating in an administered network environment, including program modules that write registry data in a binary format. An exemplary embodiment of the present invention is implemented for the "OFFICE 2000" suite of programs, including the "WORD" processing program and the "EXCEL" spreadsheet program, manufactured and marketed by Microsoft Corporation of Redmond, Wash.

The present invention can be implemented as a program module that reads numeric registry data having a predetermined format from a specific location in the registry, and interprets this data as values for one or more binary bytes stored in a global data structure. System policies, which are normally limited to string or numeric data types, can now include data that an application stores in binary format. The inventive program module can change the values of the specific bytes during the run-time of the application without affecting the other values in the data structure.

The present invention solves the problems of the prior art by reading specially formatted registry data and using these data values to alter data in a binary global data structure. This has the effect of enforcing a particular value each time a program module, such as an application, is run. The registry data is read by an application at launch time. For the global data structure, the application looks in a particular place in the registry and enumerates the named values maintained at that registry location. The format of these values typically defines an offset and a number of bits for processing at that location. The value data determines the settings of the affected bits. For example, the registry data can be formatted to define an offset of 540, 2 bits, and a value of 3. This is interpreted as, in effect, "set the $540^{th}$ and $541^{st}$ bits in the global data structure to the value of 3".

The program module also can prevent the writing of temporarily altered values to permanent storage when the data structure is saved as part of normal application execution or shut-down sequences. This involves storing the values set by policy in a temporary data structure while the application is running. When the application exits, the temporarily stored values are written back into the global binary data structure before their structure is persisted to disk.

Referring now to the drawings, in which like numerals represent like elements throughout the several figures, aspects of the present invention and the exemplary operating environment will be described.

Operating Environment

FIG. 1 and the following discussion are intended to provide a brief, general description of a suitable computing environment in which the invention may be implemented. While the invention will be described in the general context of an operating system that runs in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CDROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the RAM 25, including an operating system 35 having a registry 35a, one or more application programs 36, a global data structure 37, policy program module 38, and other program modules and data. The operating system 35, including the registry 35a, the application programs 36, the policy program module 38 and other program modules and data can be stored on storage media for the drives connected to the computer 20, such as the hard disk drive 27.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

For the exemplary computer environment that supports the administration of a system policy, the remote computer 49 typically operates as a server, such as a network log on server, and the memory storage device 50 stores program modules and data, including an application program 36 and a policy file 39. The policy file 39, also described as a POL file, comprises system policy data that can be applied to a client machine when that computer logs on to the network 51 or 52. The policy file 39 can be created by a system administrator to control registry settings, user preferences or restrictions, and other registry data for machines that operate on the network 51 or 52. A system policy editor (not shown) can be used by the system administrator to create or modify the policy file 39.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules and data relative to the personal computer 20, or portions thereof, may be stored in a remote memory storage device, such as the memory storage device 50. It will be appreciated that the network connections shown are exemplary and other means of establishing a communications link between the computers may be used.

Creating and Applying a Policy

For an exemplary embodiment, a system administrator can use a system policy editor to create or edit a system policy file for standard (string/DWORD) settings and for values implemented as bit values in REG_BINARY data. In a representative example, the system administrator can create a system policy for Microsoft's "WORD" program by selecting a particular binary value for the registry setting "Correct TWo INitial CApitals," which can be implemented by a single bit in a binary data structure. In turn, the system administrator can save the system policy to a policy file, also described as a POL file, on a log-on server. The system policy defined by this policy file can be applied to a client machine in response to the client's log-on to the administered computer network.

Figure 2:
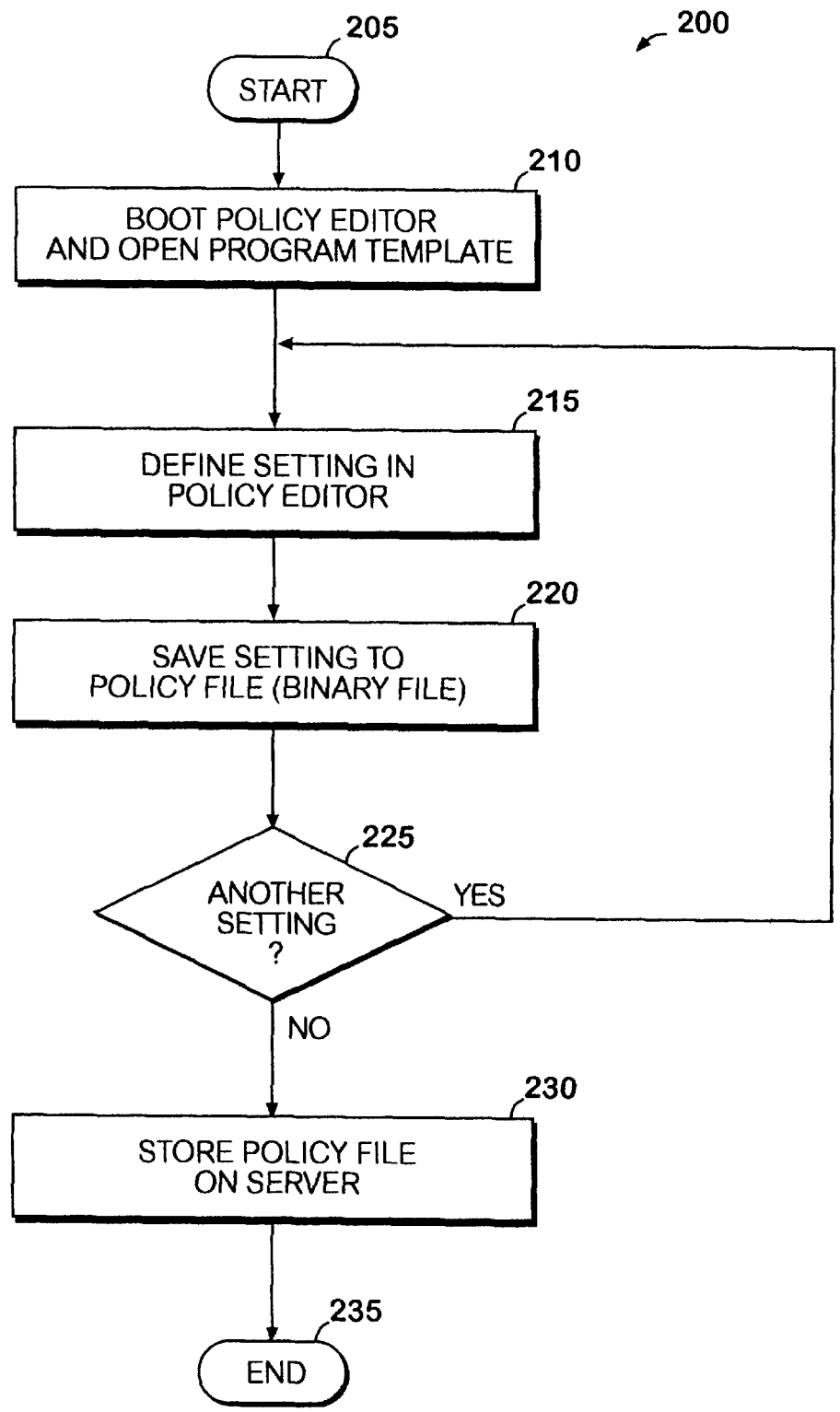
FIG. 2 is a logical flowchart diagram illustrating the steps of a method for defining a system policy for an administered computer environment and storing that policy on a server in accordance with an exemplary embodiment of the present invention.

FIG. 2 is a logical flowchart diagram illustrating the exemplary steps of a method for creating and storing a policy file for use in an administered computer network. Turning now to FIG. 2, the exemplary policy file creation method 200 begins at the "START" step 205 and proceeds to step 210. A system administrator, responsible for defining the policy settings for computing machines connected to the administered computer network, boots the policy editor program module in step 210. Upon launching the policy editor program, the system administrator can open a program template to define the policy file settings for a selected program module available to users within the administered computing environment. In Microsoft's "OFFICE 2000" program suite, a system administrator can boot the SYSTEM POLICY EDITOR to create a policy file or POL file that is typically stored on a network log-on server. By opening this text-formatted policy template, the system administrator can use the SYSTEM POLICY EDITOR to select a registry setting for a particular program module of the "OFFICE 2000" program and can choose a value to enforce for that setting.

In step 215, the system administrator can define or modify a setting in a program template by use of the policy editor program. The setting can be saved in step 220 to a policy file. In step 225, an inquiry is conducted to determine whether the system administrator desires to define or revise a binary registry setting. If so, the "YES" branch is followed from step 225 to step 215. Otherwise, the "NO" branch is followed from step 225 to step 230.

The policy file is stored in step 230 on a server of the administered computer network, typically on a log-on server. Upon logon of a client computer to the administered computer network, the operating system running on the client computer can locate the policy file at the server and thereafter apply the defined registry settings to the computer. The method 200 then terminates at the "END" step 235.

Transmitting Policy to a User

When a client machine logs on via a server containing the policy file, the operating system will find this policy file and apply the administrator's changes to the machines registry. The registry value for the representative example of the "Correct TWo INitial CApitals" setting is shown in Table 1:

Table 1

Key:  KEY_CURRENT_USER\Software\Policies\Microsoft\Office\9.0\Word\Options\Assist
Value name: fTwoInitialCaps_24_1
Value data: 1
Data type: REG_DWORD Registry Value Format An exemplary embodiment of the present invention uses the key path, the location in the registry where a value is written, to distinguish between policies intended for different applications. A key path also can be used to distinguish between policies intended for different binary data structures within the same application. Key locations can be selected that are not used by other program modules or for other purposes to avoid unnecessary enumeration of the registry. This prevents unnecessary checks of the registry that would slow an application launch. For example, in the exemplary embodiment represented by Microsoft's "OFFICE 2000" programs, there are three policy keys for the "WORD" program and one policy key for the "EXCEL" program, as shown in Table 2:

Table 2

Software\Policies\Microsoft\Office\9.0\Word\Options\vpref
Software\Policies\Microsoft\Office\9.0\word\Options\Assist
Software\Policies\Microsoft\Office\9.0\Word\Options\vprsu
Software\Policies\Microsoft\Office\9.0\Excel\Options\BinaryOptions The value name is formatted with the information needed to correctly apply a policy to a client machine. The preferred syntax for value names is shown in Table 3:

Table 3

<comment>_<offset>_<number of bits>

The <comment> text before the first underscore is optional and is used primarily for documentation purposes. This text is generally used to describe a variable name in the code, for example, "UsePixelsInDialogs." The <offset> text describes the location in the binary data structure that a policy is intended to control. In particular, the offset identifies the number of bits from the beginning of the data structure to the beginning of the policy control region. The <number of bits> text describes the size of this particular setting in bits. A value that can be set from 0 to 7, for example, requires 3 bits. Each bit can be taken to represent a digit in binary arithmetic, so that "111" equals 7, "010" equals 2, and "100" equals 4. The value data typically does not have a special format. For example, value data can be formatted as a DWORD with the desired value to enforce.

Applying a Policy for an Application

Although a policy value can be written to the registry upon log-on, the value has no effect until the user boots the application. During launch, the policy program associated with an application attempts to load policy settings for the application's binary setting objects (such as the vpref, Assist, and vprsu keys listed above in Table 2) by opening and enumerating the contents of the appropriate registry keys. When a registry key corresponding to a data structure does not exist or is empty, the policy program can determine that a policy is not set for that structure. The policy program, such as the policy program module 38, can be implemented on a dynamic linked library (DLL), a routine internal to the application, or an external routine.

When the policy program finds a value for one of the special policy keys in the registry, it parses the value name to determine the offset and size of the bit field that the policy is intended to control. If the offset and size are valid, the policy program creates a record of the original value of the field and adds that record to a list of all the policy changes applied to this data structure.

The policy program then translates the value associated with the policy into a bit mask that is applied to the binary data structure. In the "TWoINitialCApitals" example, this translation results in turning on the 24th bit in the structure. For another representative example, if the size of the field is 3 bits and the value is two ("0 10" in binary), then the policy program forces off the $24^{th}$ bit, forces on the $25^{th}$ bit, and forces off the $26^{th}$ bit.

Figure 3A:
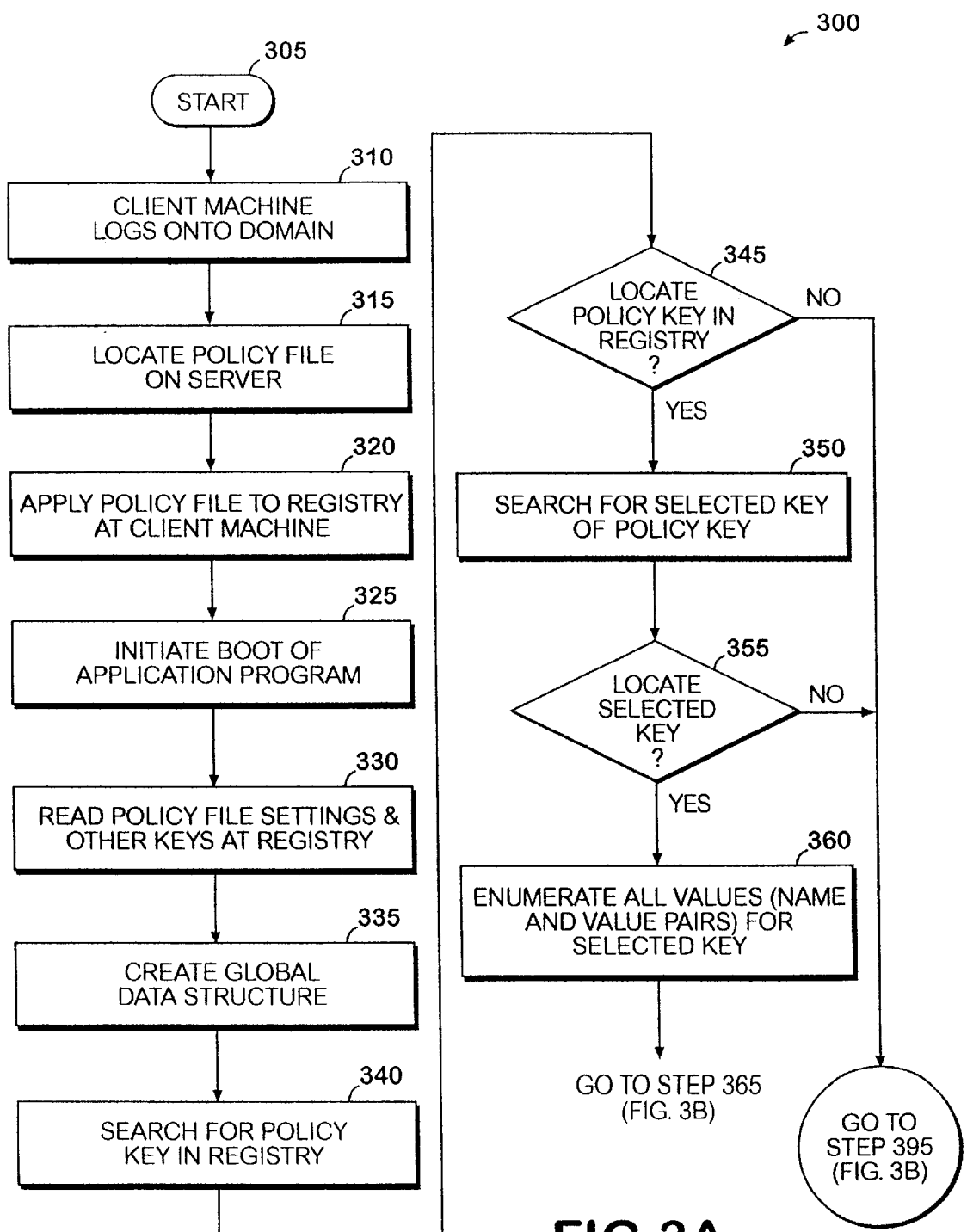

FIG. 3 is a logical flowchart diagram illustrating the exemplary steps of a method for applying a policy file containing binary registry settings to a computer within an administered computing environment. Turning now to FIG. 3, the exemplary method 300 begins at the "START" step 305 and proceeds to step 310. A user's computer, otherwise described as a client machine, operating within the administered computer network, logs onto the network domain in step 310. In step 315, the operating system running on the client machine locates the policy file on the log-on server of the computer network. The policy file is then applied in step 320 to the registry of the client machine.

In step 325, a program module, such as an application program, is launched at the client machine. During the program launch, the policy program module, such as a policy program module 38 of FIG. 1, reads the registry settings applied by the policy file in step 330. This policy program module, which is typically associated with one or more underlying applications, also can access other data maintained in the key-based hierarchical structure of the registry,. The policy file settings, which have been applied to the registry, can include both alphanumeric and binary data formats. Other data maintained in the registry is typically formatted in conventional alphanumeric string data formats.

In step 335, at least one global data structure is created to store policy-related registry data for use during the program session. This global data structure is typically maintained within system memory of the computer, such as the RAM 25, for efficient access to this policy information. It will be appreciated that different data structures can be created for different policies or applications.

In step 340, a search is conducted by the policy program module for the policy key in the registry at the client machine. For a representative example, a policy key in the registry can be represented by the string "HKEY_CURRENT_USER\Software\Policy." In step 345, an inquiry is conducted to determine whether the policy key can be located within the registry at the client machine. If the response to this inquiry is negative, the "NO" branch is followed from step 345 to step 395 of FIG. 3B. The launch of the application program is completed in step 395. Otherwise, the "YES" branch is followed from step 345 to step 350.

In step 350, a search is conducted for a selected key associated with the policy key. For a representative example, a selected key for Microsoft's "WORD" program is represented by the string "HKEYCURRENTUSER\Software\policy\Microsoft\Office\9.0\Word\Options\Assist." The "ASSIST" sub-key serves as a unique identifier for this selected key of the registry. An inquiry is conducted in step 355 to determine whether the selected key is available in the registry at the client machine. If the response to this inquiry is negative, the "NO" branch is followed to step 395, where launch operations for the application program are completed. If the selected key is located in step 355, however, the "YES" branch is followed to step 360. Values for the selected key are enumerated in step 360. This task constructs a list of each name/data pair for the values associated with the selected registry key.

Turning now to FIG. 3B, a search is conducted in step 365 for a value name/data pair. An inquiry is conducted in step 370 to determine whether a value/name data pair can be located within the enumerated list. If the response to this inquiry in step 370 is negative, the "NO" branch is followed to step 375. An inquiry is conducted in step 375 to determine whether another value name/data pair is available in the enumerated list. If so, "YES" branch is followed through step 365 to begin another search. Otherwise, the "NO" branch is followed from step 375 to step 392.

If a value name/data pair is located within the enumerated list during step 370, the method 300 proceeds to step 380. In step 380, the offset and the data size is identified for the located value name/data pair. The offset identifies the stored location in the global data structure for control by the policy. The offset can be used to find the number of bits within a range extending between the start of the data structure and the start of the classified policy control region of the data structure. The size identifies the size of the particular binary setting in bits.

In step 383, a record is created for the old value maintained at the location in the global data structure specified by the offset and size. This old value within the global data structure is then changed to the value specified by the value name/data pair in step 386. An inquiry is conducted in step 389 to determine whether additional value name/data pairs are available in the enumerated list. If so, the "YES" branch is followed from step 389 to step 365. Otherwise, the "NO" branch is followed from step 389 to step 392 to determine whether another key associated with the policy key should be examined for the application program.

If a key remains that has not yet been examined for the policy applied to the application program, "YES" branch is followed from step 392 to step 350 to search for the next selected key. Otherwise, the "NO" branch is followed from step 392 to step 395. The launch of the application is completed in step 395.

Preventing Infection

When the user exits the application, the policy program can save changes made to the application's registry settings. Before these settings are saved to disk, the policy program checks the list of policy changes made to each of the binary data structures for which policy is supported. If the policy program added any records to these lists during startup, it now rolls back those changes, erasing any changes made to the affected fields by policy. This also overwrites any user changes to the affected fields. In other words, the fields are effectively locked so long as policy is present.

Turning now to another example, assume that the system administrator applies a binary policy to the "Number of Entries in the Most-recently-used File List" setting. Although the original value for this setting is "4", the administrator creates a policy forcing the value to "5". During application launch, the policy program saves the old value of "4" and forces the value to "5". During the application session, the user changes the value to "9". Neither the user value of "9" nor the policy value of "5" to the user's registry is maintained for use in a subsequent application session. If the administrator later lifts the policy for the setting, the user-setting will revert to the original value of "4".

FIG. 4 is a logical flowchart diagram illustrating the steps of a method for rolling back changes to data structure fields affected by the application of a policy in accordance with an exemplary embodiment of the present invention. Turning now to FIG. 4, the roll-back method 400 begins in step 405 in response to exiting the application program. In step 410, the saved "old" values are written into the global data structure, thereby effectively overriding any changes made to the data structure fields affected by the application of policy. In addition, any user changes to the affected data structure fields also can be overwritten during step 410. In step 415, the settings of the global data structure are saved to non-volatile memory, typically the hard disk of the client machine. The method 400 terminates at the "END" step for 420.

Thus, from the foregoing description, it will be apparent to those skilled in the art that the present invention provides a novel and non-obvious mechanism for supporting the application of a system policy to the content maintained by a registry of an operating system in a computer, including data values having both string and binary formats. The present invention can read a registry data value and interpret this data as a value for one or more binary bits stored in a global data structure. At launch time, a program module can look within a predetermined location in a registry and enumerate values maintained in this registry location. These registry values preferably have a format defining an offset parameter for the global data structure and the number of bits for processing at that location. Consequently, the registry values contain encoded information that affect binary-formatted content at a specified location within a global data structure. This enables the application of a system policy to registry data values having a binary format. Because the present invention also provides a mechanism that avoids permanently overriding registry data values affected by a system policy to non-volatile memory at the conclusion of the program session, the original registry values can be preserved for use during a subsequent program session. In other words, parameters affected by the application of a system policy can be rolled back to original values upon termination of a program session.

The present invention may be conveniently implemented in one or more program modules that are based upon and implement the features illustrated in FIGS. 2–4. No particular programming language has been described for carrying out the various procedures described above. It is considered that the operations, steps, and procedures described above and illustrated in the accompanying drawings are sufficiently disclosed to permit one of ordinary skill in the art to practice the present invention. However, there are many computers and operating systems which may be used in practicing the present invention and, consequently, no detailed computer program could be provided which would be applicable to all of these many different systems. Each user of a particular computer will be aware of the language and tools that are most useful for that user's needs and purposes. In addition, although the invention was described in the context of an application program running within an administered computer network environment, those skilled in the art will appreciate that the invention is applicable to other computing environments and program modules.

It will also be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented process for applying a system policy to binary data for a program module operating on a client computer within an administered network environment, comprising the steps:

locating a selected one of the keys corresponding to a policy parameter within a registry of the client computer;

obtaining a registry parameter for the selected key, the registry parameter having a predetermined format defining (1) a value name comprising an offset value for a binary data structure and a size value and (2) a data value; and identifying a control region of the binary data structure based on the offset value and the size value and setting the control region to the data value.

2. The computer-implemented process of claim 1 further comprising the step setting the control region of the binary data structure to the data value in response to initiating a launch of the program module.

3. The computer-implemented process of claim 1 further comprises the step of adding to a list of policy changes a record of an original binary data item in the control region prior to setting the control region to the data value of the registry parameter.

4. The computer-implemented process of claim 3 further comprising the steps:

responsive to initiating a termination of a session of the program, obtaining the record containing the original binary data item from the list of policy changes;

replacing the data value of the registry parameter with the original binary data item listed in the record; and saving the content of the binary data structure to non-volatile memory of the computer.

5. The computer-implemented process of claim 1, wherein the offset value identifies a start position for the control region within the binary data structure, the control region representing a binary data location having a value controllable by the system policy.

6. The computer-implemented process of claim 5, wherein the size value defines the extent of the control region with the binary data structure.

7. A computer-readable medium for storing a policy program having instructions which, when executed by a computer, apply a system policy to binary data for a program module by performing the steps:

(a) obtaining a policy parameter for the system policy;

(b) locating a selected one of the keys corresponding to the policy parameter within a registry of the computer;

(c) enumerating all registry values for the selected key, each registry value comprising (1) a value name defining an offset value for a binary data structure and a size value and (2) a data value; and (d) for each one of the registry values, identifying a control region of the binary data structure based on the offset value and the size value and replacing an original binary data item in the control region to the data value.

8. The computer-readable medium of claim 7, wherein the policy program comprises further instructions which, when executed by the computer, repeat steps (c)–(d) for each one of the remaining keys corresponding to the policy parameter.

9. The computer-readable medium of claim 7, wherein the policy program comprises further instructions which, when executed by the computer, perform the step of creating a temporary record of the original binary data item for the control region of the binary data structure prior to replacing the original binary data with the data value for one of the registry values.

10. The computer-readable medium of claim 9, wherein the policy program comprises further instructions which, when executed by the computer, perform the steps:

responsive to initiating a termination of a session of the program, obtaining the original binary data item from the record;

replacing the data value for one of the registry values with the original binary data item obtained from the record; and saving the binary data structure to non-volatile memory of the computer.

11. The computer-readable medium of claim 7, wherein the offset value identifies a start position for the control region within the binary data structure, the control region representing a binary data location having a value controllable by the system policy, and the size value defines the extent of the control region with the binary data structure.

12. A method for applying a system policy to binary data for a program module, comprising the steps:

(a) responsive to initiating a launch of the program module, locating a selected one of the keys corresponding to a policy parameter within a registry of the computer;

(b) listing all registry values for the selected key, each registry value comprising (1) a value name including an offset value for a binary data structure and a size value and (2) a data value;

for each one of the registry values, (c) identifying a control region of the binary data structure based on the offset value and the size value;

(d) creating a temporary record for the original binary data item for the control region of the binary data structure;

(e) replacing the original binary data for the control region of the binary data structure with the data value for one of the registry values; and (f) repeating steps (b)–(e) for each one of the remaining keys corresponding to the policy parameter.

13. The method of claim 12 further comprising the steps:

responsive to initiating a termination of a session of the program, obtaining the original binary data item from the temporary record;

replacing within the binary data structure the data value for one of the registry values with the original binary data item obtained from the record; and saving the content of the binary data structure to non-volatile memory of the computer.

14. The method of claim 12, wherein the offset value identifies a start position for the control region within the binary data structure, the control region representing a binary data location having a value controllable by the system policy, and the size value defines the extent of the control region with the binary data structure.

15. A computer-implemented process for applying a system policy to binary data for use during a session of a program module operating on a client computer within an administered network environment, comprising the steps:

(a) responsive to initiating a launch of the program module, obtaining a policy parameter for the system policy, the policy parameter associated with the program module;

(b) locating a selected one of the keys corresponding to the policy parameter within a registry of the computer;

(c) obtaining at least one registry value for the selected key, the registry value having formatted content defining a control region within the binary data structure and a data value;

(d) creating a temporary record for the original binary data item maintained in the control region of the binary data structure;

(e) replacing the original binary data for the control region of the binary data structure with the data value for the registry value;

(f) responsive to initiating a termination of the session of the program, obtaining the original binary data item from the temporary record;

(g) replacing within the binary data structure the data value for the registry value with the original binary data item obtained from the record; and (h) saving the content of the binary data structure to non-volatile memory of the computer.

16. The process of claim 15, wherein the formatted content of the registry value defines an offset value and a size value, the offset value identifying a start position for the control region within the binary data structure and the size value defining the extent of the control region with the binary data structure.

* * * * *